United States Patent
Khajavikhan et al.

(10) Patent No.: US 10,415,970 B2
(45) Date of Patent: Sep. 17, 2019

(54) ROTATION SENSOR, ROTATION SENSING METHOD, AND APPLICATIONS

(71) Applicant: UNIVERSITY OF CENTRAL FLORIDA RESEARCH FOUNDATION, INC., Orlando, FL (US)

(72) Inventors: Mercedeh Khajavikhan, Orlando, FL (US); Demetrios Christodoulides, Casselberry, FL (US); Hossein Hodaei, Orlando, FL (US); Mohammad Soltani, Belmont, MA (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/799,027

(22) Filed: Oct. 31, 2017

(65) Prior Publication Data

US 2018/0252527 A1     Sep. 6, 2018

Related U.S. Application Data

(60) Provisional application No. 62/415,792, filed on Nov. 1, 2016.

(51) Int. Cl.
    *G01C 19/72*     (2006.01)
    *G01C 19/66*     (2006.01)

(52) U.S. Cl.
    CPC ........ *G01C 19/722* (2013.01); *G01C 19/66* (2013.01); *G01C 19/727* (2013.01)

(58) Field of Classification Search
    CPC ..... G01C 19/66; G01C 19/722; G01C 19/727
    See application file for complete search history.

(56) References Cited

U.S. PATENT DOCUMENTS

| | | | | |
|---|---|---|---|---|
| 7,450,800 B2 * | 11/2008 | Barwicz | ............... | G01C 19/66 372/92 |
| 8,976,364 B2 * | 3/2015 | Sorrentino | ............ | G01C 19/64 356/461 |

(Continued)

FOREIGN PATENT DOCUMENTS

JP     62247209 A * 10/1987 ........... G01C 19/722

OTHER PUBLICATIONS

Aghaie, Kiarash Zamani et al. "Rotation sensitivity analysis of a two-dimensional array of coupled resonators". Proc. SPIE 9378, Slow Light, Fast Light, and Opto-Atomic Precision Metrology VIII, 93781P, Mar. 10, 2015, pp. 93781P-1-93781P-10. (Year: 2015).*

(Continued)

*Primary Examiner* — Michael A Lyons
(74) *Attorney, Agent, or Firm* — Neil R. Jetter; Jetter & Associates, P.A.

(57) ABSTRACT

A chip-scale ultrasensitive ring laser gyroscope that utilizes the physics of exceptional points. By exploiting the properties of such non-Hermitian degeneracies, the rotation-induced frequency splitting becomes proportional to the square root of the gyration speed ($\Omega^{1/2}$), thus enhancing the sensitivity to low angular rotations by orders of magnitudes. At its maximum sensitivity limit, the measurable spectral splitting is independent of the radius of the cavity rings involved. Binary and ternary systems and associated methods are described.

6 Claims, 7 Drawing Sheets

(56) References Cited

U.S. PATENT DOCUMENTS

| | | | | |
|---|---|---|---|---|
| 2009/0244544 | A1* | 10/2009 | Terrel | G01C 19/721 |
| | | | | 356/461 |
| 2015/0295379 | A1* | 10/2015 | Ozdemir | H01S 3/0627 |
| | | | | 359/337.4 |
| 2017/0125911 | A1* | 5/2017 | Alu | H01O 15/0086 |
| 2017/0307375 | A1* | 10/2017 | Bowers | G01C 19/66 |

OTHER PUBLICATIONS

Khajavikhan, M. et al. "Single-mode parity-time-symmetric microring lasers". 2015 11th Conference on Lasers and Electro-Optics Pacific Rim (CLEO-PR), Aug. 24-28, 2015. (Year: 2015).*

* cited by examiner

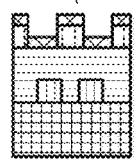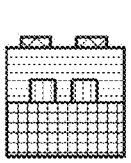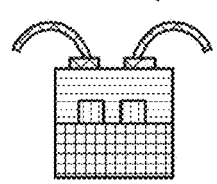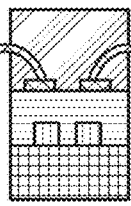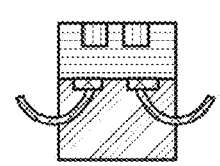
FIG. 9A  FIG. 9B  FIG. 9C  FIG. 9D  FIG. 9E
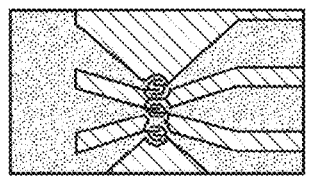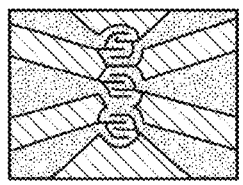
FIG. 9F  FIG. 9G  FIG. 9H  FIG. 9I  FIG. 9J
FIG. 10A  FIG. 10B  FIG. 10C  FIG. 10D
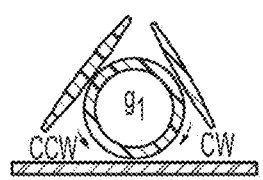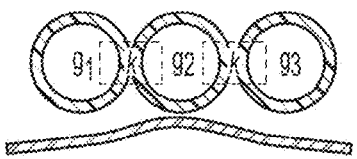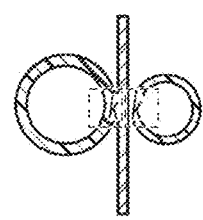
FIG. 11A  FIG. 11B  FIG. 11C

ROTATION SENSOR, ROTATION SENSING METHOD, AND APPLICATIONS

RELATED APPLICATION DATA

The instant application claims priority to U.S. provisional application Ser. No. 62/415,792 filed Nov. 1, 2016, the subject matter of which is incorporated by reference in its entirety.

GOVERNMENT FUNDING

Funding was provided by the National Science Foundation (NSF) under grants (ECCS-1128520, ECCS-1454531); the Army Research Office (ARO) under grant (W911NF-16-1-0013); the Office of Naval Research (ONR) under grant (N00014-16-1-2640); the Air Force Office of Scientific Research under grant (AFOSR) (FA9550-14-1-0037). The U.S. government has certain rights in the invention.

BACKGROUND

Aspects and embodiment are most generally in the field of rotational motion sensing; more particularly, aspects and embodiments are directed to optical rotational motion sensors, optical rotational motion sensing methods, and applications thereof; most particularly to chip-scale (microscale), integrated, parity-time symmetric laser gyroscope systems, associated methods, and applications.

In 1913, Sagnac demonstrated how the rate of rotation associated with an inertial frame of reference can be determined by optical means. In his experiments, the rotation speed was measured through the phase difference between two beams traveling in opposite directions within a loop. Since then, this approach has been used to develop various families of optical gyroscopes. One breakthrough in this area came shortly after the discovery of the laser, when Macek and Davis introduced gain inside the loop. In this respect, the phase shift between the two counter-propagating beams is effectively converted into a splitting in the resonant frequencies that can in turn be readily measured. In an ideal non-rotating ring laser, the two counter-propagating modes are expected to exhibit the same frequency. On the other hand, if this same system rotates at an angular frequency, the two initially degenerate resonant frequencies split, as given by the following expression $$\Delta\omega = \frac{8\pi A\Omega}{L\lambda}. \quad (1)$$

Here, $\lambda$ is the wavelength inside the material, A is the enclosed area, and L is the perimeter of the ring. Ideally, as long as the frequency separation ($\Delta\omega$) exceeds the quantum limit imposed by the spontaneous emission noise, the rotation speed can be uniquely determined through a heterodyne measurement. For example, for a ring laser with a radius of 10 cm operating at a wavelength of 1.55 μm, and rotating at the rate of ~1°/hour, one can expect a frequency splitting that is at best on the order of ~0.6 Hz.

In many applications, it is imperative to detect considerably lower angular velocities, i.e., $\Omega \sim 10^{-4}$°/hour, a precision that is already attained in free-space laser ring gyroscopes. Unfortunately however, such sensitivity levels have so far remained practically out-of-reach in integrated settings where the size of the ring is generally smaller. In addition, due to scattering off the walls of waveguides, the so-called 'lock-in effect,' arising from unwanted coupling between the two counter-propagating modes is more pronounced in such on-chip platforms. Finally, most semiconductor gain systems suffer from a higher quantum noise level due to carrier induced index fluctuations.

Semiconductor gain systems have also been considered for implementing ring laser gyroscopes. The main advantage of semiconductors is that they can be electrically pumped directly, therefore they circumvent the requirement for integration of additional pump sources. So far, the best detection rate reported by a single ring is on the order of ~100 revolution/sec (~$10^{-8}$°/hour), although it has been theoretically predicted that centimeter scale InP ring laser gyroscopes can reach rates on the order of 180°/hour. Using a dual-cavity ring laser gyroscope is expected to improve this rate. Ultimately, however, the minimum detectable rotation rate is set by the size of the active ring, which is not easily scalable because of the large non-uniformities across most III-V wafers. In addition, most semiconductor gain systems suffer from higher quantum noise levels due to carrier induced index fluctuations. Considering all the above issues, one may conclude that, without a significant enhancement of intrinsic sensitivity, the prospect of using standard III-V semiconductor microring lasers for detecting rotation rates on the order of $\omega \sim 1$-100°/hour is daunting.

Measuring rotation rate is of utmost importance in a number of existing and emerging areas of science and technology, from general relativity to robotics, medical-imaging, virtual reality, computer games, unmanned aerial vehicles (drones), and driverless cars. Over the years, various physical phenomena have been utilized to measure the rotation of a frame of reference. Such effects include mechanical movement, Coriolis force, Larmor precession frequency of nuclear spins, and quantum whistling, to name a few. In the realm of optics, the Sagnac effect has been employed to develop some of the finest and most accurate tools for determining rotation rate. Along these lines, free-space ring laser gyroscopes (RLG) and passive fiber optic gyroscopes (FOG) are among the most sensitive rotational sensors built to date. These devices are routinely used for navigation of aircrafts and in defense-related applications.

In recent years, navigation and automation are increasingly becoming indispensable parts of consumer electronics—an area that clearly favors integrated settings and batch fabrication. Despite their superior performance in terms of sensitivity and their resilience to mechanical vibrations, current optical gyroscopes are not as amenable to miniaturization as, for example, their MEMS counterparts are. This is mainly because the Sagnac phase shift that is the physical effect behind the operation of optical gyroscope sis fundamentally proportional to the area enclosed by the optical path that light is traveling around. In order to accumulate sufficient phase in response to small rotations, the area must be large. This raises a question as to whether there is a place for on-chip optical rotational sensors in the growing market of civilian navigation, automation, and even gaming.

The inventors have recognized the benefits and advantages to be realized by a laser ring gyroscope based on the physics of non-Hermitian degeneracies in order to address the issues outlined above. By exploiting the properties of exceptional points in judiciously designed parity-time-symmetric arrangements, the frequency splitting can become proportional to the square-root of the gyration speed, $\Omega^{1/2}$, an effect that can boost the sensitivity to small rotations by orders of magnitude. Moreover, at its maximum sensitivity limit, the splitting no longer depends on the radius of the rings involved. In addition, the lock-in effect can be entirely avoided by enforcing directional propagation in each ring. The embodied invention can open new directions towards the realization of highly sensitive, miniature laser ring gyroscopes on-chip.

SUMMARY

An aspect of the invention is a chip-scale parity-time (PT) symmetric optical rotation motion sensor. According to an exemplary embodiment, the chip-based optical rotation motion sensor includes at least two coupled ring resonators of radius, R, and coupling strength κ. The rings are identical in shape but are characterized by different levels of gain and/or loss. The embodied multi-resonator system is PT symmetric once it is gauged by a constant gain/loss bias. A bus waveguide is disposed operationally adjacent one or either of the rings to direct the lasing emission into a photodiode in order to measure the resulting beat frequency. In various non-limiting aspects, the rings may be coupled side-by-side or, alternatively one disposed vertically above/below the other. The cross-section of the rings is designed so as to support only the fundamental TE mode. Unidirectional light propagation can be enforced in the rings through a geometrical design, for example using an s-bend bypass in the ring. The ring resonators may be tuned by the incorporation of heaters operationally coupled to the rings.

An embodiment of the invention comprises a ring cavity with two coupled, terminated, active waveguides.

An embodiment of the invention, referred to as a dark state microring arrangement comprises two dissimilar microring resonators coupled via a central waveguide. This system is biased at its exceptional point by ensuring that the resonance miss-match of the two microrings is equal to the coupling strength.

An aspect of the invention is a method for angular motion sensing. According to an exemplary embodiment, the method involves the steps of providing a chip-based optical rotation motion sensor that includes at least two coupled ring resonators of radius, R, and coupling strength κ that is gauged by a constant gain/loss bias and a bus waveguide, generating at least two counter-directionally rotating beams having the same frequency in the at least two ring resonators, respectively, coupling the light generated in the at least two ring resonators to the bus waveguide, and measuring a beat frequency of the light from the bus waveguide to determine an angular rotation rate.

BRIEF DESCRIPTION OF THE DRAWINGS

FIG. 5A shows Schematics of binary (left) and ternary (right) paritytime-symmetric photonic molecules, with loss, gain and neutral resonators. Coupling between the resonators is represented by κ; FIG. 5B shows A paritytime-symmetric ternary micro-ring system with equidistantly spaced cavities. The side resonators experience balanced gain and loss whereas the middle one is neutral. The rings (radius, 10 μm; width, 500 nm; height, 210 nm) consist of six quantum wells and are fabricated on an InP wafer. Three gold microheaters (thickness, approximately 150 nm) are fabricated underneath each cavity and are used to fine-tune the resonance wavelengths and to introduce thermal perturbations. The heating elements are shown in the inset; FIG. 5C shows An SEM image of the structure at an intermediate fabrication step, according to illustrative and exemplary aspects of the invention.

FIG. 6A shows The real parts of the eigenfrequencies ($\mathrm{Re}(\omega_n)$) of the ternary paritytime-symmetric system as a function of the normalized gain/loss contrast g/κ and the detuning ε/κ. The third-order exceptional point (EP3) occurs at $g=2^{1/2}$ and ε=0; FIG. 6B shows The imaginary parts of the eigenfrequencies ($\mathrm{Im}(\omega_n)$); FIGS. 6C and 6D show analytical (dashed lines) and numerical (solid lines) solutions for the real (FIG. 6C) and imaginary (FIG. 6D) parts of the eigenfrequencies, for $g=2^{1/2}$; FIG. 6E shows analytical (dashed line) and numerical (solid line) results for $\mathrm{Re}(\omega_0-\omega_1)/\kappa=\Delta\omega/\kappa$, demonstrating cube-root behavior as a function of the detuning; FIG. 6F shows the results shown in FIG. 6E on a logarithmic scale. The slope of ⅓ confirms the cube-root response, according to illustrative and exemplary aspects of the invention.

FIG. 7A shows observed frequency splitting as a function of the power that is dissipated in the heaters ($\varepsilon \propto I^2$). The perturbation is imposed on the active cavity. The inset demonstrates a slope of ½ on a logarithmic scale, confirming the existence of a second-order exceptional point. The solid lines are the simulated square-root behavior, the filled circles indicate experimental data, and the error bars indicate the uncertainty in frequency measurements due to the spectrometer; FIG. 7B shows measured enhancement factor as a function of the induced perturbation. For a detuning of less than 10 GHz, an enhancement of about 13 times is observed. The enhancement is defined in terms of experimentally accessible quantities ($\Delta\omega_{EP2}/\varepsilon$, where ε is the measured detuning for an isolated cavity at similar heater power). The solid line shows the curve $\Delta\omega_{EP2}/\varepsilon \propto (\kappa/\varepsilon)^{1/2}$ and squares depict experimental data. The inset shows the perturbation as a function of the dissipated power, where the solid line is a linear fit to the measured values (circles), according to illustrative and exemplary aspects of the invention.

FIG. 8A shows intensity profile of the lasing mode in a ternary paritytime-symmetric arrangement at a third-order exceptional point. The energy in the central cavity is approximately twice that in the side resonators, because the eigenvector is given by (a, b, $c)^{EP}=A_0(1,-i\,2^{1/2},-1)$; FIG. 8B showns spectra of the three lasing modes (identified by the three peaks) as the system departs from the exceptional point with increasing $I^2 \propto \varepsilon$; FIG. 8C shows the splitting between two neighboring lasing lines as a function of $I^2$. Inset shows a line with a slope of ⅓ on a logarithmic scale. The solid lines are the simulated cube-root behavior, the filled circles denote experimental data, and the error bars indicate the uncertainty in frequency measurements due to the spectrometer; FIG. 8D shows the measured sensitivity enhancement is about 23 times for detunings of less than 10 GHz. The solid line shows the curve $\Delta\omega_{EP3}/\varepsilon \propto (\kappa/\varepsilon)^{2/3}$ and squares indicate measured values. Inset, the perturbation as a function of $I^2$, where circles denote experimental data and the solid line is a linear fit, according to illustrative and exemplary aspects of the invention.

FIGS. 9A-9J schematically show fabrication steps in realizing paritytime-symmetric photonic molecules. FIG. 10A shows a microscope image of the fabricated metallic micro-heaters; and FIG. 10B shows an expanded view of the micro-heaters of FIG. 10A; FIG. 10C shows micro-heaters heaters electrically connected to the pins of the header via wire bonding; and FIG. 10D shows The photonic molecule systems are accessible for measurement from the back side through a hole in the header, according to illustrative and exemplary aspects of the invention.

FIGS. 11A-11C schematically show alternative non-Hermitian systems to the two identical side-coupled resonators embodiment: FIG. 11A shows a microring with two waveguides; FIG. 11B shows a three-ring system capable of supporting third-order exceptional point; FIG. 11C shows a dark-state configuration of two dissimilar rings strongly coupled to a central open waveguide, according to illustrative and exemplary aspects of the invention.

DETAILED DISCUSSION OF NON-LIMITING, EXEMPLARY EMBODIMENTS

We disclose herein below a novel class of ring laser gyroscopes based on the physics of non-Hermitian degeneracies. By exploiting the properties of exceptional points in judiciously designed parity-time (PT)-symmetric-type arrangements, the ensuing frequency splitting is proportional to the square root of the gyration speed ($\omega^{1/2}$), an effect that can boost the sensitivity to small rotations by orders of magnitude. Moreover, when the maximum sensitivity limit is reached, the splitting is no longer proportional to the radii of the rings involved. The embodied invention enables the lock-in effect to be entirely avoided by enforcing directional propagation in each ring. The strong bifurcation around a non-Hermitian degeneracy can be utilized to actively reposition this system back to its optimum operating point for rotation measurement.

Figure 1:
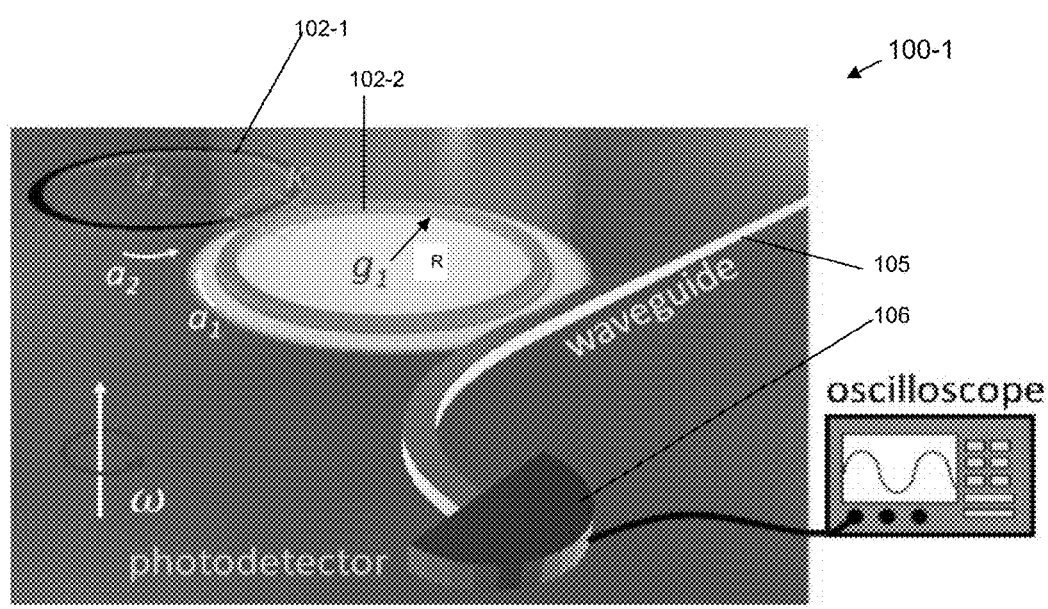
FIG. 1 schematically shows a chip-based PT-symmetric laser gyroscope system, according to an exemplary embodiment of the invention.

FIG. 1 depicts a schematic of an exemplary chip-based non-Hermitian gyroscope 100-1. The gyroscope includes a pair of coupled ring resonators 102-1, 102-2 of radius R, and coupling strength κ. The rings are identical but are subject to different levels of gain and/or loss. The contrast between the amplification levels experienced by the rings can be introduced, for example, through preferential pumping, or other techniques known in the art. Although this system is not strictly invariant under the simultaneous action of parity (P) and time (T) operators, it becomes PT symmetric once it is gauged by a constant gain/loss bias. In a rotating frame, one may assume that the beam propagating in a clockwise (CW) direction in one of the rings acquires an effective Sagnac phase shift with respect to a counter-clockwise (CCW) wave of the same frequency circulating in the other. A bus waveguide 105 may be placed on the side of one (or both) ring(s) to direct the lasing emission into a photodiode 106 in order to measure the resulting beat frequency.

Figure 2:
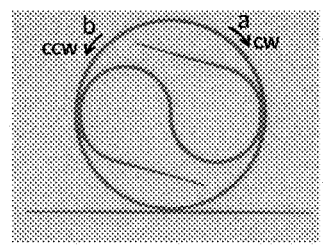
FIG. 2 schematically shows a ring cavity with an internal S-bend, allowing light to propagate in a unidirectional fashion, according to an illustrative aspect of the invention.

The mechanism behind the enhanced sensitivity in the embodied PT symmetric coupled cavity configuration can be explained by considering the modal behavior of the system. In general, each ring, when uncoupled, can support a number of longitudinal modes in both the CW and CCW directions. Without loss of generality, here we limit the analysis to a single longitudinal mode in one direction. The cross section of the rings can be designed so as to support only the fundamental TE mode. Unidirectional light propagation can be enforced in the rings through a geometrical design, for example using an s-bend bypass as illustrated in FIG. 2. In order to analyze this system, we consider the interaction between the CW field in one cavity and the CCW traveling wave in the neighboring resonator. In this respect, the interplay between the electric modal fields in the two identical rings can be effectively described through a set of time-dependent coupled equations:

$$i'a_{1,2} + \omega_{1,2}a_{1,2} - ig_{1,2}a_{1,2} + \kappa a_{2,1} = 0 \tag{2}$$

where $\alpha 1$, $\alpha 2$ represent the modal amplitudes in the two cavities. The angular frequencies, $\omega_1$ and $\omega_2$, are determined by the resonance conditions for each resonator in the absence of coupling. For two identical cavities these frequencies are expected to be the same ($\omega_1 = \omega_2 = \omega_0$). The gain (loss) in each ring is denoted by $g_1$ and $g_2$, respectively. One can show that the eigenfrequencies are given by $$\omega_{PT_{1,2}} = i\omega_0 + (g_1+g_2)/2 \pm i\sqrt{\kappa^2 - ((g_1-g_2)/2)^2}. \tag{3}$$

While for a certain range of values of κ, this system will support two distinct modes, Eq. (3) shows that at the vicinity of $2\kappa = |g_1 - g_2|$, the dimensionality of the system abruptly collapses.

Figure 3:
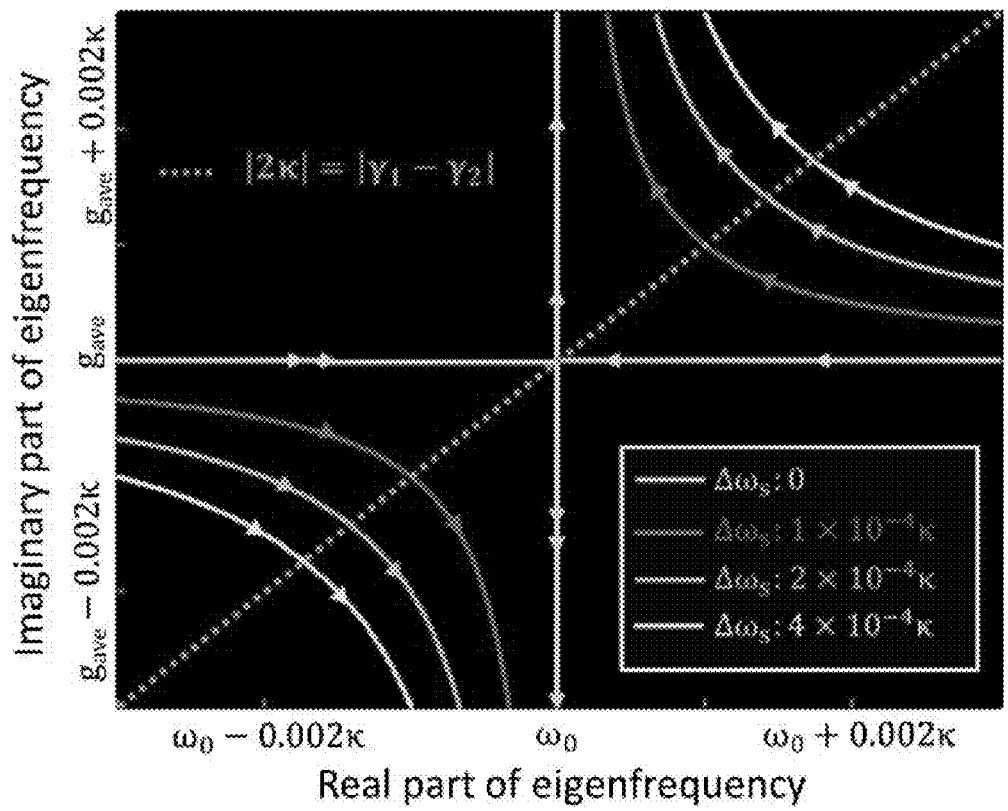
FIG. 3 schematically graphically shows the trajectories of the eigenfrequencies ($i\omega_{PT}$) in the complex plane for different detuning levels ($\Delta\omega_s$). The dotted line represents the condition where $2\kappa=|g_1-g_2|$. For the perturbed systems, the distance between the intersections of the associated curves (depicted by the same color) and the dotted line represents the splitting between the corresponding eigenfrequencies. The exceptional point is located exactly at the center of the plane, according to an illustrative aspect of the invention.

At this point, not only the two eigenfrequencies coalesce, but also the eigenvectors become identical. As a result, the system lases at only one frequency $\omega_0$. This type of degeneracy (which is unique to non-Hermitian arrangements) marks the onset of a phase transition. The location in the parameter space in which this degeneracy occurs is known as an exceptional point. The solid lines in FIG. 3 show the trajectory of the eigenvalues in the complex plane. Note that a global change in the gain (loss) in this two-ring configuration will only deform the trajectories, but the overall trend remains unchanged.

We now consider this same system in a rotating frame having an angular frequency Ω. If the magnitude of the maximum speed ($\upsilon_{max} = \Omega R$) is small compared to the speed of light, one can then ignore the relativistic effects. Under these conditions, in a single ring, the corresponding resonant frequency is expected to change by an amount $\Delta\omega_s = 0.5\,\Delta\omega$ due to the Sagnac shift. In other words, in this rotating frame, the two resonant frequencies associated with these rings (when uncoupled), will be modified according to $\omega_1 = \omega_0 + \Delta\omega_s$ and $\omega_2 = \omega_0 - \Delta\omega_s$. For a system that was originally placed at the exceptional point the presence of such rotation-induced detuning perturbations will give rise to a new set of eigensolutions:

$$|1\rangle = \begin{bmatrix} 1 & e^{i\theta'} \end{bmatrix}^T \quad |2\rangle = \begin{bmatrix} 1 & -e^{-i\theta'} \end{bmatrix}^T \tag{4}$$

$$\omega_{PT_{1,2}\text{perturbed}} = i\omega_0 + (g_1+g_2)/2 \pm i\sqrt{\kappa^2 - ((g_1-g_2+2i\Delta\omega_s)/2)^2},$$

where $\theta'=\sin^{-1}((g_1-g_2+2i\Delta\omega_s)/2\kappa)$ Equation (4) clearly demonstrates that the rotation-induced detuning forces the system to depart from the exceptional point. This implies that, even at $2\kappa=|g_1-g_2|$, once it is perturbed, this arrangement will support two supermodes with a beat frequency $\Delta\omega_{PT}=|\Im\{\omega_{PT1}-\omega_{PT2}\}|$.

For small rotation velocities, $\Delta\omega_s \ll |g_1-g_2|$.

The splitting between the real components of these two eigenfrequencies ($i\omega_{PT1,2}$) is now expressed by $$\Delta\omega_{PT} \cong 2\sqrt{|\Delta\omega_0\kappa|}. \quad (5)$$

Equation (5) confirms that the beat frequency in the PT-symmetric ring gyroscope has a square-root-dependence on $\Delta\omega_s$. For small rotation rates ($\Delta\omega_s \ll 1$), this square-root behavior can indeed result in a substantially increased frequency separation. This behavior is also evident in FIG. 3, where the trajectories of the eigenfrequencies are depicted for several detuning levels. The dotted line represents the locus of points at which $2\kappa=|g_1-g_2|$ is satisfied. The distance between the intersections of the iso-color curves and the dotted line indicates the splitting between the corresponding eigenfrequencies.

It should be noted that the square-root dependence of the beat frequency on externally-induced perturbations is universal in all non-conservative systems that are operating around an exceptional point. However, in coupled cavity PTsymmetric-like configurations, this response is further scaled by the square root of the coupling strength $\kappa$. For a pair of identical resonators, under the weak coupling approximation, the coupling factor, in principle, can be as large as a quarter of the free spectral range, i.e., $\kappa_{max}=c/8\pi R n_g$; here $n_g$ is the group index. By inserting this value in Eq. (5), the maximum attainable beat frequency in this arrangement is $$\Delta\omega_{PTmax}=\sqrt{n\omega_0\Omega/2\pi n_g}. \quad (6)$$

Remarkably, Eq. (6) shows that unlike standard ring laser gyroscopes, the maximum frequency splitting is now completely independent of the radius of the rings involved. In this respect, one can now envision a micro-scale ring laser gyroscope that, in principle, can exhibit a sensitivity similar to that obtained in centimeter-long systems. Of course, for smaller rings, $\kappa_{max}$ is larger; this has to be compensated for by utilizing higher levels of gain-loss contrast, something that is readily available in semiconductor active media.

It is instructive to compare the rotation-induced frequency splitting in a PT system ($\Delta\omega_{PT}$) and the beat frequency associated with a pair of counter-propagating modes in a single ring ($\Delta\omega=2\Delta\omega_s$). In particular, one can define a sensitivity enhancement (S.E.) factor as the ratio $\Delta\omega_{PT}/\Delta\omega$:

$$S.E.=\sqrt{|2\kappa/\Delta\omega|}. \quad (7)$$

Figure 4:
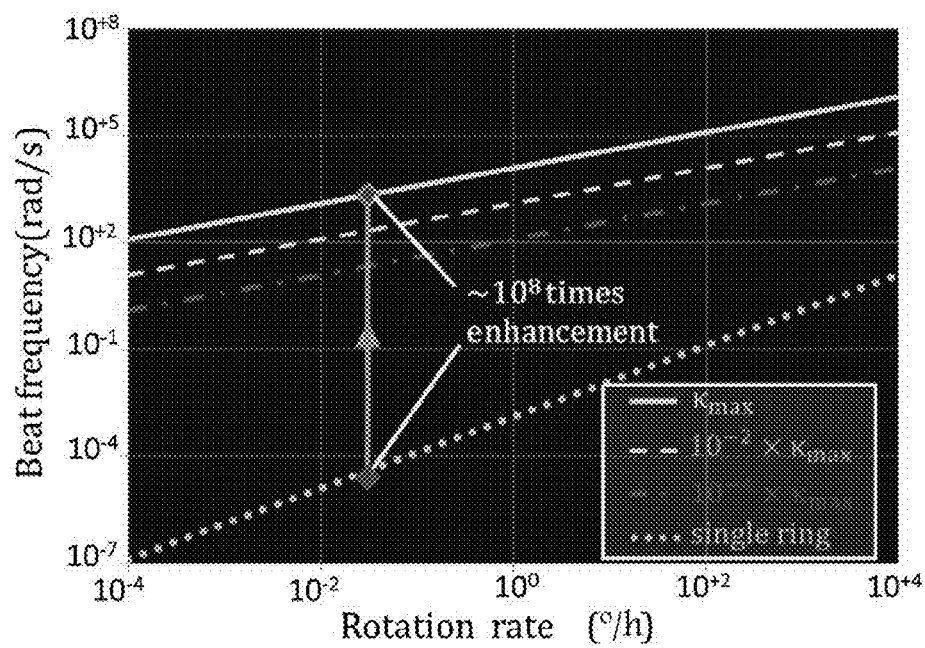
FIG. 4 schematically graphically shows beat frequency as a function of the rotation rate for a single ring (dotted line) and the PT-symmetric coupled ring systems with various coupling strength levels, according to an illustrative aspect of the invention.

This coefficient may be viewed as the scale factor for the PT-symmetric ring laser gyroscope. The S.E. depends on the coupling strength and the rotation rate ($A\Omega$). As an example, if the coupling strength is $\kappa \sim 10^{12}$ s$^{-1}$, and if $\Delta\omega=1$ Hz, then one can expect a $S:E \cong 10^6$. This implies that a rotation of $\Omega=100°/h$ that could at best generate a frequency splitting on the order of ~0.6 Hz in a single ring with a radius of a 100 µm, now in a two-ring PT system, can result in a splitting of ~1.8 MHz, an improvement of more than six orders of magnitude. To further elucidate these aspects, FIG. 4 compares the performance of a two-ring PT-symmetric arrangement to that of a single ring. The radii of the rings are here taken to be R=100 µm, and the operating wavelength is centered at $\lambda_0=1.55$ µm. FIG. 4 shows the beat frequency as a function of the rotation rate in a loglog scale. The dotted line with a slope of unity represents the beat frequency expected from a conventional ring laser gyroscope. On the other hand, in a non-Hermitian PT-symmetric system, the slope of the line drops to one-half, indicating a superior square-root behavior.

While most free-space ring laser gyroscopes are based on counter-propagating modes in a single ring, for on-chip laser gyroscopes, a double-ring (or race-track) configuration has been speculated as a favorable geometry. This is mainly because in waveguide-based lasers, unlike existing free-space ring laser gyroscopes, the scattering from the walls is more pronounced and less preventable. The scattering couples two counter-propagating modes and makes it difficult to deduce the rotation rates below the lock-in limit. In this respect, an advantage of a double ring arrangement is that the beating mechanism is no longer between the two counter-propagating modes of the same ring. In a coupled ring geometry, the modes in the two rings can be contrasted with respect to each other. As a result, one can avoid the complications arising due to lockin effects by designing the rings in such a way that they inherently support modes in a uni-directional fashion. For on-chip single ring lasers, there are currently a number of techniques to suppress one of the counter-propagating modes at the expense of the other. One example is to use a known s-bend cavity structure (FIG. 2). For larger rotation rates, where lock-in effects are not a concern, the rings may be designed to support two counter-propagating modes. In addition, to improve the detection limit, one may also want to consider reported designs that permit high coherence emission.

In designing sensors with large scale factors, one important consideration is the sensor's response to unwanted drifts of the parameters, either due to environmental variations or to intrinsic noise effects. Clearly, the proposed gyroscope, involving coupling, gain-contrast and, possibly, some detuning between its constituent elements, is expected to react in a complex fashion to such deviations from its nominal parameters. For microscale on-chip devices, environmental changes such as thermal and mechanical vibrations, are not expected to generate large detuning between the neighboring elements. For example, COMSOL simulations show that a heat source at a 1 K higher temperature than the sample, located 1 mm away from the arrangement, induces ~1 pK detuning between the rings. In order to reduce detunings, one may consider designs that are less susceptible to environmental factors.

A preliminary error analysis indicates that this device can reach its full potential for sensing purposes if it operates at or close to an exceptional point. Therefore, it is advantageous to constantly reposition the system at the exceptional point. Exceptional points are well-defined features in parameter space since, at these junctures, the arrangement undergoes an abrupt phase transition. Consequently, such points can be readily identified by monitoring the variation of the observable ($\delta\Delta\omega_{PT}$) with respect to a scanning parameter ($\Delta g$ or $\kappa$). Whether the arrangement is at rest or not, at the vicinity of this point, the absolute change in the $\Delta\omega_{PT}$ reaches a maximum. One can then choose the measurement result performed at this extreme point to be the most accurate value for the rotation rate. In this regard, the quantum noise of the emitters is expected to limit the measurement accuracy if it becomes comparable to $\Delta\omega_{PT}$. It should be noted that the existence of such a well-defined reference point is key for the embodied device. In the past decade, there have been a number of proposals for passive on-chip gyroscopes based on fast light effects in coupled resonators, a property that can also lead to large scale factors. However, due to the lack of such reference points, these systems are susceptible to the drift of their parameters. Once at the exceptional point, the uncertainties in coupling/gain-contrast can at most generate the same degree of error in the rotation rate ($\delta Q/Q = \delta\kappa/\kappa = \delta g/g$).

Degenerate states appear ubiquitously in many physical settings as a result of an underlying symmetry. Breaking this symmetry through an external perturbation can lead to a splitting in the eigenvalue domain—an effect that has been exploited in a wide range of detection systems. In Hermitian environments, such as those encountered in quantum mechanics, the induced shift or separation in the eigenspectrum is at most of the same order as the perturbation itself (with $|\epsilon|\ll 1$). In optics, this type of response is typically manifested in the resonance frequencies via variations in the complex refractive index and has provided the basis for various sensing arrangements, including microcavity sensors and ring laser gyroscopes. In recent years, there has been a growing realization that non-conservative systems that operate around their degeneracies or exceptional points can provide a new way of enhancing their sensitivity beyond what is possible in standard arrangements. In such non-Hermitian configurations, the eigenfrequency splitting $\Delta\omega$ can be accentuated by orders of magnitude, because it follows an $\epsilon^{1/N}$ dependence, where N represents the order of the exceptional point. In general, the order N is determined by the number of eigenvalues that simultaneously coalesce at the exceptional point. What makes this class of singularity so reactive to small perturbations is the fact that, in addition to the eigenvalues, all of the corresponding eigenvectors also merge at the relevant point in parameter space. In essence, around exceptional points, the system behaves as if it suddenly loses its dimensionality, because the vector space becomes severely skewed. Given that $\Delta\omega \sim \epsilon^{1/N}$, it is clear that the sensitivity of the system will increase with the order of the exceptional point—a feature that is highly desirable in detection applications. During the past few years, second-order exceptional points have been investigated in various photonic structures, including lasers, photonic crystals, synthetic lattices, and topological arrangements. On the other hand, higher-order non-Hermitian singularities have been reported only in coupled acoustic cavities that involve loss. Such higher-order bifurcations and the ensuing boosts in the sensitivity of optical resonant arrangements have yet to be observed.

Figure 5A:
FIGS. 5A-5C schematically show paritytime-symmetric coupled cavity systems that support exceptional points.

Of the many possible types of non-Hermitian photonic systems, parity-time-symmetric arrangements are of particular interest because they provide an excellent platform for exploring the physics of exceptional points. For instance, paritytime symmetry can be readily established in coupled resonators that simultaneously include gain and loss in a balanced fashion, while allowing direct control over the energy exchange process through coupling. FIG. 5A depicts two such paritytime-symmetric photonic molecules. The first involves two identical cavities, one experiencing gain and the other an equal amount of loss. The second consists of three resonators: the two from the first system separated by a neutral cavity. It can be shown that the former supports a second-order exceptional point, and the latter a third-order one. As a result, in the first case (N=2), the eigenvalues are expected to diverge according to $\epsilon^{1/N}$, whereas for N=3 the splitting would be more abrupt because it follows $\epsilon^{1/3}$. In principle, higher-order exceptional points can be synthesized in this manner by following a recursive bosonic quantization procedure.

To demonstrate the enhanced sensitivity in a paritytime-symmetric ternary micro-ring laser system that supports a higher-order singularity (a third-order exceptional point), the active structure is implemented on an InP-based quantum well semiconductor wafer. The gain-neutral-loss profile is subsequently imposed by dynamically shaping the optical pump beam. The resonance frequencies are fine-tuned using micro-heaters. By doing so, we can independently control the real and imaginary components of the refractive-index distribution, which is essential for establishing higher-order exceptional points. The resulting bifurcations in the frequency domain are monitored and characterized by allowing the system to operate in the lasing regime.

Figure 5B:
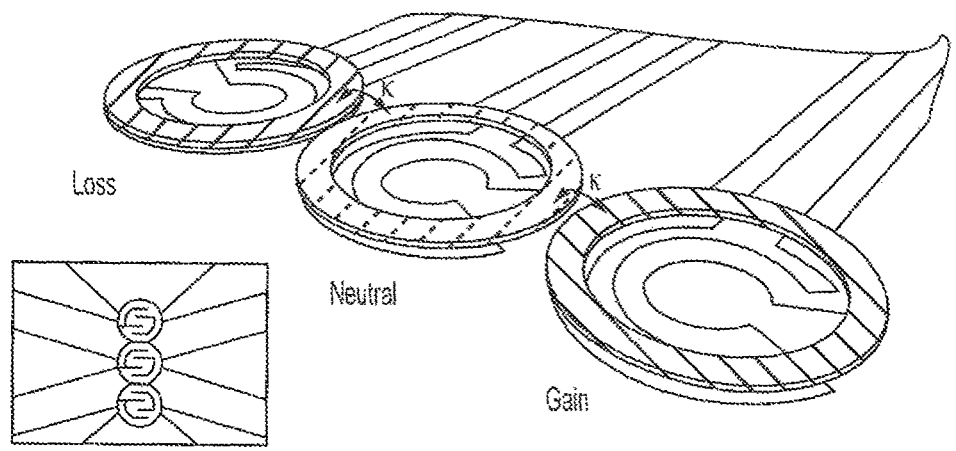
Figure 5C:
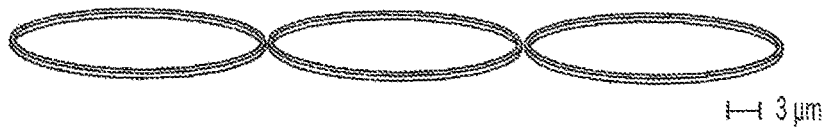

For the ternary paritytime-symmetric coupled micro-ring system (FIG. 5B), the two side ring resonators are subjected to equal amounts of gain and loss (g) while the middle ring remains neutral. In addition, the rings evenly exchange energy with each other with a coupling strength $\kappa$. A metallic (Au) heater is positioned under each cavity, with a vertical separation of approximately 3 μm. A scanning electron micrograph (SEM) image of the structure, at an intermediate stage of fabrication, is shown in FIG. 5C. The modal field evolution in this structure obeys idV/dt=HV, where V=(a, b, c)$^T$ represents the modal column vector; a, b and c represent field amplitudes in the amplifying, neutral and lossy cavities, respectively; and t represents time. H is the associated 3×3 non-Hermitian Hamiltonian:

$$H = \begin{pmatrix} ig+\epsilon & \kappa & 0 \\ \kappa & 0 & \kappa \\ 0 & \kappa & -ig \end{pmatrix} \quad (8)$$

in which +g (−g) accounts for the gain (loss). Without loss of generality, here the external perturbation $\epsilon$ is imposed on the cavity with gain; however, it could be introduced anywhere along the diagonal of the matrix or to any of the coupling terms.

In the absence of any disturbance ($\epsilon$=0), assuming a harmonic dependence of V of the form $e^{-i\omega_n t}$, we can determine the complex eigenfrequencies $\omega_n$, (n∈{−1, 0, 1}) of the ternary system directly by solving the cubic algebraic equation $$\omega_n(\omega_n^2 - 2\kappa^2 + g^2) = 0.$$

This equation indicates that when the gain/loss contrast reaches a critical value (in this case, $g=2^{1/2}\kappa$), all three eigenfrequencies coalesce at $\omega_n$=0 and the system exhibits a third-order exceptional point. Moreover, at this specific point, the three eigenvectors of the ternary photonic molecule also coalesce, at (a, b, c)$^{EP}$=$A_0(1,-i\ 2^{1/2}, -1)$, where $A_0$ is a normalization constant, indicating that the energy in the central (neutral) cavity is twice that circulating in the other two resonators (which are subject to gain and loss).

Figure 6A:
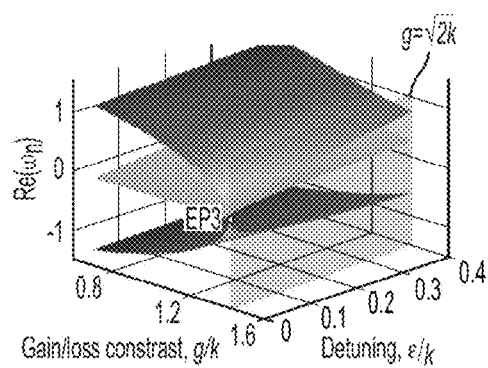
FIGS. 6A-6F schematically shows bifurcations of complex eigenfrequencies around a third-order exceptional point.
Figure 6B:
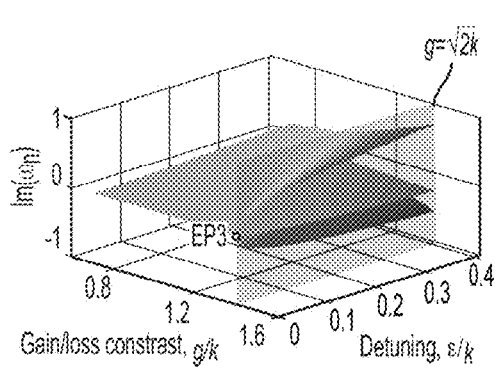

To understand how a small detuning or variation in the gain cavity affects the arrangement, we assume a small value for $\epsilon$. In this case, the three complex eigenfrequencies of the configuration are obtained by numerically solving the characteristic cubic equation associated with the Hamiltonian in equation (8) (see FIGS. 6A and 6B). Of particular interest is how this system reacts around the third-order exceptional point, when $g=2^{1/2}\kappa$. The response is highlighted in the two cross-sections (in both the real and imaginary domains) in FIGS. 6C, 6D, 6E and 6F (solid curves). The difference between two eigenfrequencies (in this case, $\omega_0$ and $\omega_1$) is also plotted (FIG. 6E, solid curve) as a function of $\epsilon$. By considering the logarithmic behavior of this curve (see FIG. 6F, solid line), we find that the slope of the response is ⅓, thus confirming that perturbations around a third-order exceptional point experience an enhancement of the form $\varepsilon^{1/3}$.

Alternatively, we can explain this behavior using perturbation theory. Around the third-order exceptional point, the characteristic equation is $$\omega_n^3 - \varepsilon\omega_n(\omega_n + i\sqrt{2}\kappa) + \varepsilon\kappa^2 = 0 \quad (9)$$

The roots of this cubic equation can be self-consistently obtained by assuming that $\omega_n = c_1\varepsilon^{1/3} + c_2\varepsilon^{2/3} + \ldots$, contrary to what might be expected in Hermitian settings, in which the perturbative series proceeds in integer powers of $\delta^1$. From these expressions, we find that $$\omega_n = e^{-i(2n+1)\pi/3}\kappa^{2/3}\varepsilon^{1/3} + \frac{i\sqrt{2}}{3}e^{i(2n+1)\pi/3}\kappa^{1/3}\varepsilon^{2/3}$$

with $n \in \{-1, 0, 1\}$. The response of the system based on this expression (FIG. 6C-6F, dashed curves) is in close agreement to that obtained numerically. Our analysis indicates that the real parts of $\omega_0$ and $\omega_1$ diverge from each other in an $\varepsilon^{1/3}$ fashion. Consequently, the sensitivity of the ternary system can be assessed by monitoring the separation of the $\omega_0$ and $\omega_1$ spectral lines, which is expected to approximately follow $$\Delta\omega_{EP3} = 3\kappa^{2/3}\sqrt[3]{\varepsilon}/2$$

The micro-ring resonators used in this study have radii of 10 μm (with a free spectral range of approximately 10 nm), widths of 500 nm and heights of 210 nm. The cross-section of each ring is designed to ensure single transverse mode conditions at the wavelength of operation $\lambda_0 \approx 1600$ nm. The system was implemented using InGaAsP quantum wells (see FIGS. 9A-9J) to provide the necessary modal gain, which is estimated to be about 100 cm$^{-1}$. Given that the optical group index in these nano-waveguides is approximately 4 around the operating wavelength, $g \approx 10^{12}$ s$^{-1}$. The coupling coefficients $\kappa$ reach similar levels when varying the distance between neighboring rings.

In our experiments, the imaginary components of the refractive index in the different regions of the structure are engineered by spatially shaping the pump beam at 1,064 nm. The real part of the refractive index is fine-tuned using micro-heaters to ensure that the cavities are phase-matched. Both of these procedures are advantageous to bring the coupled micro-ring lasers into the exceptional-point regime. Once the configuration is set to operate at such a state, the gain cavity is perturbed by supplying current I into the corresponding heater. By doing so, the change in the refractive index is varied linearly with the electrical power that is dissipated in the resistor ($\varepsilon \propto I^2$). As a result, the lasing frequencies begin to diverge and the ensuing splitting as a function of $\varepsilon$ is monitored. The relationship between the induced differential detuning and the power of the heaters is experimentally characterized by intentionally decoupling the micro-rings.

Figure 7A:
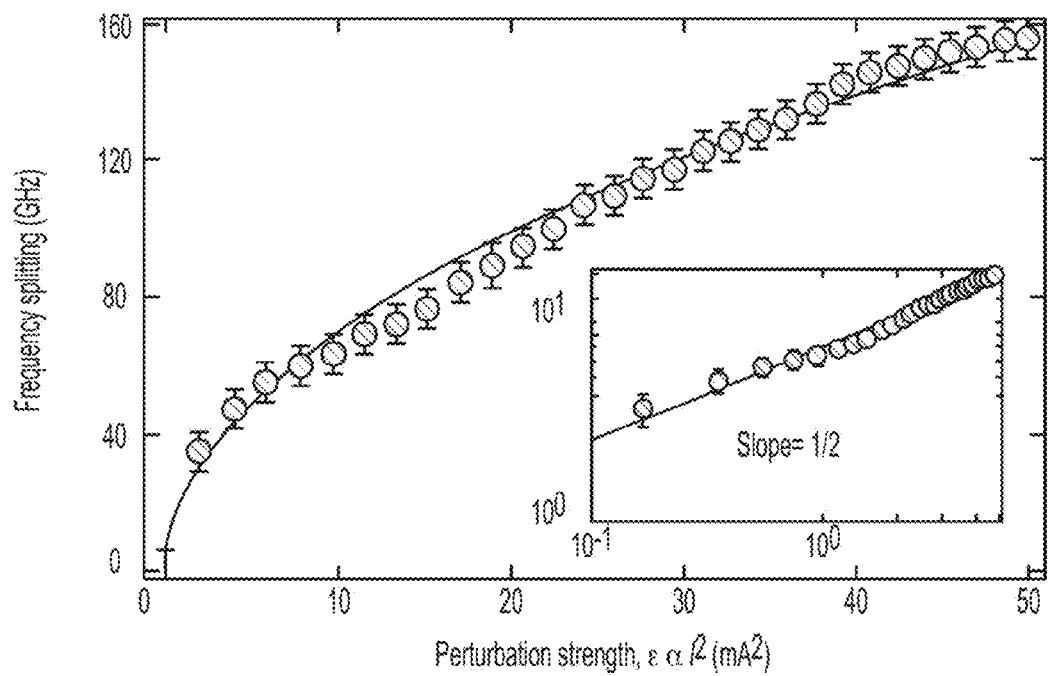
FIGS. 7A and 7B schematically graphically show a binary paritytime-symmetric system operating around a second-order exceptional point.
Figure 7B:
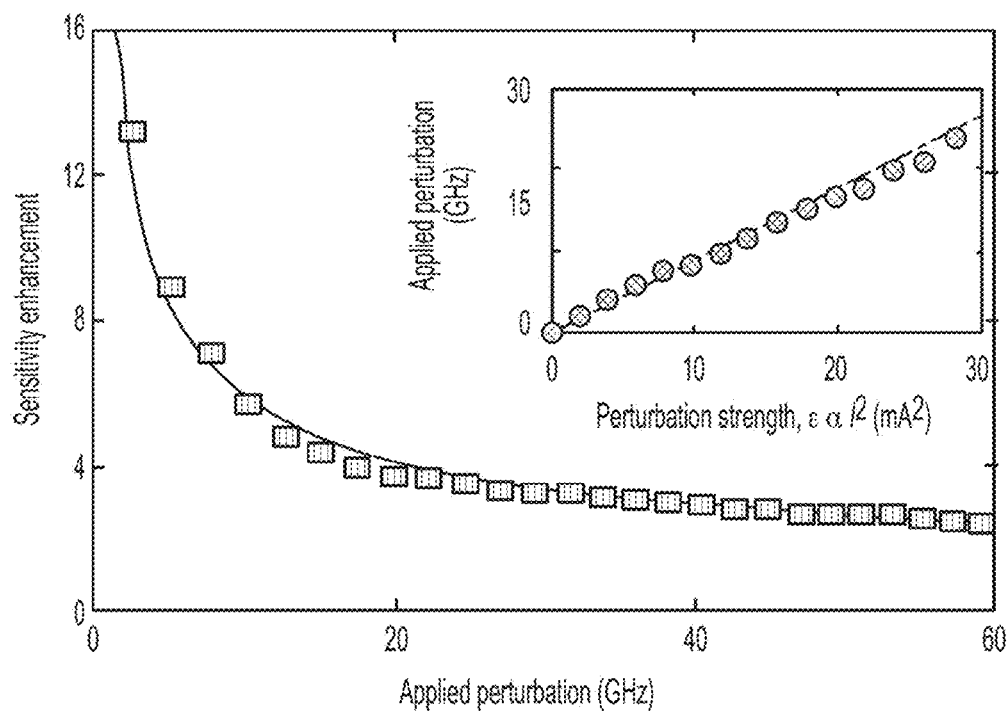

We first characterize the bifurcation behavior of a second-order exceptional point associated with a paritytime-symmetric coupled micro-ring structure (FIG. 5A, left). Once a small frequency mismatch $\varepsilon$ is thermally introduced to the optical oscillator around the second-order exceptional point, the two lasing frequencies split according to $\Delta\omega_{EP2} = (2\varepsilon\kappa)^{1/2}$. The coupling factor in this binary arrangement is measured to be about $10^{12}$ s$^{-1}$ when the rings are separated by 100 nm. FIG. 7A clearly demonstrates a square-root wavelength splitting in response to changes in the power dissipated in the heater, in accordance with theoretical expectations. The observed linear slope of ½ in the corresponding logarithmic plot affirms this behavior (FIG. 7A, inset). FIG. 7B depicts the measured enhancement in sensitivity as a function of the induced perturbation (in terms of the shift in resonance frequency). In our study, the enhancement is defined in terms of experimentally accessible quantities ($\Delta\omega_{EP2}/\varepsilon \propto (\kappa/\varepsilon)_{1/2}$). Because of the presence of an exceptional point, the enhancement factor increases for small values of $\varepsilon$. In this case, we observed an enhancement of up to 13 times in the detuning range below 10 GHz.

Figure 6C:
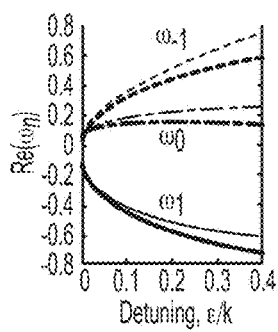
Figure 6D:
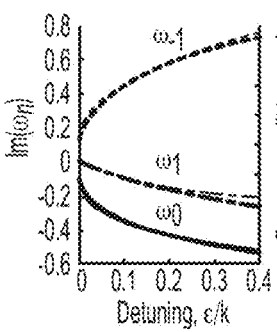
Figure 6E:
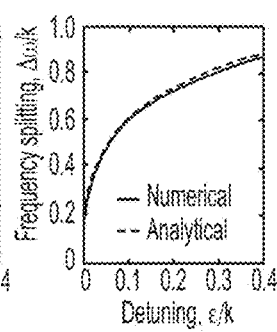
Figure 6F:
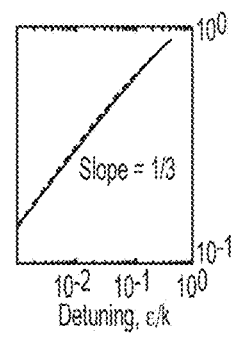
Figure 8A:
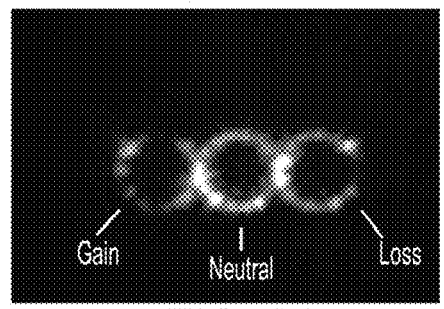
FIGS. 8A-8D schematically graphically show the response of a ternary parity-time-symmetric system biased at a third-order exceptional point.
Figure 8B:
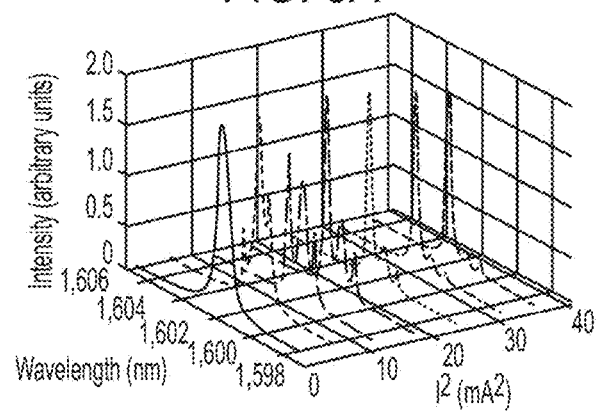
Figure 8C:
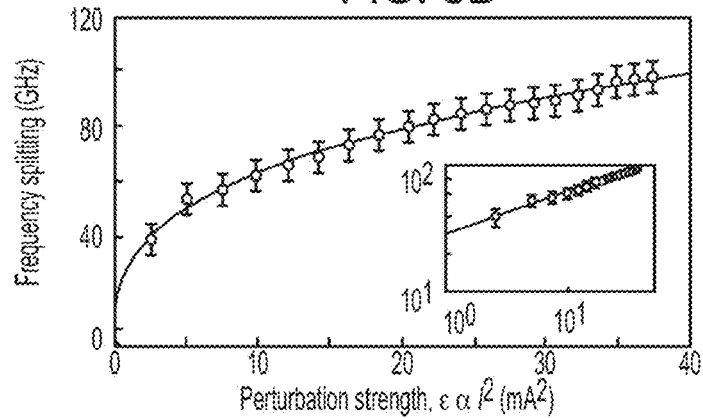
Figure 8D:
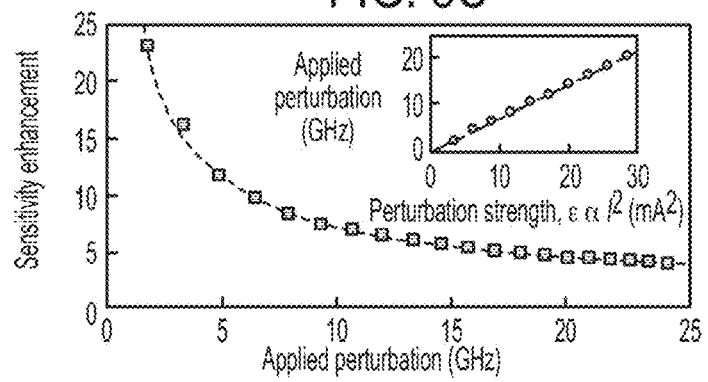

We next investigate the sensitivity of a ternary paritytime-symmetric system when operating close to a third-order exceptional point. The structure consists of three equidistantly spaced micro-rings, with a coupling strength of approximately $9 \times 10^{11}$ s$^{-1}$ when separated by 150 nm. To establish paritytime symmetry in the system, the pump beam is completely withheld from one of the side rings using a knife edge. In addition, the central (neutral) ring is partially illuminated while the third ring is fully pumped. By adjusting the position of the knife edge and the pump level, the three lasing modes of the structure gradually coalesce into one line (approximately 1,602 nm), which is associated with the emergence of a third-order exceptional point. The intensity profile (FIG. 8A) of the lasing mode at this point is captured using a charge-coupled device (CCD) camera and is found to be in agreement with that expected from theory. Integrating the intensity over the captured image reveals a distribution of (1, 1.95, 1.16); that is, the intensity in the neutral element is almost twice that in the others. Once the system reaches the regime in which the third-order exceptional point exists, the heater underneath the pumped cavity is activated. As a consequence of this perturbation, the single lasing mode splits into three distinct branches, as anticipated from theory (FIG. 6C). The spectral evolution of this transition is collected using a spectrometer with an array detector (FIG. 8B). We note that the spectral power and linewidth of each eigenvector are associated with the imaginary part of the corresponding eigenfrequency. In this regard, FIG. 8B indicates that the eigenfrequency with the largest real part (longest wavelength) is the one that exhibits the highest gain, as theoretically expected from FIGS. 6C and 6D. Moreover, FIG. 8B confirms that the laser linewidth is enhanced when the system operates in the parameter regime that corresponds to a third-order exceptional point, as is known to be the case, owing to the so-called Petermann factors. As previously indicated, in this experiment we monitor the difference between the resonance frequencies $\omega_0$ and $\omega_1$. FIG. 8C verifies that the frequency separation $\Delta\omega_{EP3}$ exhibits cube-root behavior as a function of $\varepsilon$; this is also confirmed by plotting these data on a logarithmic scale, from which we directly infer a slope of ⅓ (FIG. 8C, inset). The sensitivity enhancement factor ($\Delta\omega_{EP3}/\varepsilon \propto (\kappa/\varepsilon)^{2/3}$) corresponding to the ternary photonic molecule is plotted in FIG. 8D. In this case, the sensitivity is magnified approximately 23 times when the detuning between the active and neutral resonators is below 5 GHz.

FIGS. 11A-11C show alternative non-Hermitian systems to the two identical side-coupled resonators embodiment of FIG. 1, for rotation sensing purposes. The structure in FIG. 11A is a ring cavity with two coupled terminated waveguides. Non-Hermiticity arises between the CW and CCW modes by adjusting the amount of light that returns in respect to what is lost by the waveguides. This approach is a modification of the technique where a judicial insertion of two scattering particles around a microcavity leads to a non-Hermitian degeneracy. However, with scattering particles, the resulting scale-factor is very modest. For an equivalent on-chip realization, we plan to replace the scattering particles with two active waveguides, each terminated differently on either side. By adding gain/loss to these waveguides we can further control the properties of the exceptional point and the resulting scale-factors. In addition, since the beating occurs between two counter-propagating modes that are travelling in the same cavity, one does not need to deal with the mismatches between two rings. FIG. 11B shows a three-ring system (discussed above), where the gain contrast between each two adjacent resonators is proportional to the coupling factor (κ). The third configuration shown in FIG. 11C is a dark state microring arrangement. This structure is comprised of two dissimilar microring resonators coupled via a central waveguide. The imaginary nature of such coupling between the two cavities promotes the emergence of exceptional points. In order to bias this system at its exceptional point, the resonance miss-match of the two microrings should be equal to the coupling strength. The main advantage of such configuration is operation reliability due to its independence to the gain/loss dynamics.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

We claim:

1. A chip-scale parity-time (PT) symmetric optical rotation motion sensor, comprising:
    a semiconductor substrate including at least two coupled ring resonators of radius R having a coupling strength κ for exchanging energy; and
    a bus waveguide that is disposed on the semiconductor substrate operationally adjacent to either of the ring resonators for directing a lasing emission received from the ring resonators to a photodetector.

2. The chip-scale parity-time (PT) symmetric optical rotation motion sensor of claim 1, wherein the ring resonators are coupled side-by-side.

3. The chip-scale parity-time (PT) symmetric optical rotation motion sensor of claim 1, wherein the ring resonators are coupled vertically above/below the other, and the cross-section of the ring resonators is designed so as to support only the fundamental TE mode.

4. The chip-scale parity-time (PT) symmetric optical rotation motion sensor of claim 1, wherein the ring resonators include an s-bend bypass to provide unidirectional light propagation.

5. The chip-scale parity-time (PT) symmetric optical rotation motion sensor of claim 1, further comprising a heater operationally coupled to the ring resonators.

6. The chip-scale parity-time (PT) symmetric optical rotation motion sensor of claim 1, wherein the photodetector comprises a photodiode disposed on the semiconductor substrate.

* * * * *